United States Patent [19]

Presby

[11] 4,038,062
[45] July 26, 1977

[54] METHOD AND APPARATUS FOR INTRODUCING GEOMETRICAL PERTURBATIONS IN OPTICAL FIBER WAVEGUIDES

[75] Inventor: Herman Melvin Presby, Highland Park, N.J.

[73] Assignee: Bell Telephone Laboratories, Incorporated, Murray Hill, N.J.

[21] Appl. No.: 670,107

[22] Filed: Mar. 25, 1976

[51] Int. Cl.$^2$ ............................................ C03B 37/02
[52] U.S. Cl. ............................................ 65/2; 65/12; 65/13; 264/1; 425/76
[58] Field of Search .................... 65/2, 3 A, 4 B, 4 R, 65/DIG. 7, 13, 12; 350/96 WG; 264/1; 425/76

[56] References Cited

U.S. PATENT DOCUMENTS

| | | | |
|---|---|---|---|
| 3,063,094 | 11/1962 | Warthen | 65/12 X |
| 3,499,194 | 3/1970 | Schmick | 65/2 X |
| 3,666,348 | 5/1972 | Marcatili | 65/3 A X |
| 3,687,514 | 8/1972 | Miller et al. | 65/DIG. 7 |
| 3,823,995 | 7/1974 | Carpenter | 65/3 A X |
| 3,826,560 | 7/1974 | Schultz | 65/3 A X |
| 3,879,128 | 4/1975 | Presby | 65/2 X |
| 3,907,536 | 9/1975 | Achener | 65/3 A X |
| 3,909,110 | 9/1975 | Marcuse | 350/96 WG |
| 3,912,478 | 10/1975 | Presby | 65/2 |
| 3,957,474 | 5/1976 | Kobayashi | 65/3 A |

Primary Examiner—Robert L. Lindsay, Jr.
Attorney, Agent, or Firm—Erwin W. Pfeifle

[57] ABSTRACT

The present invention relates to method and apparatus for fabricating multimode optical fiber waveguides having reduced modal dispersion as a result of deliberate enhancement of mode coupling in the waveguide. The axial alignment and/or the diameter of an optical fiber waveguide is varied by means of one or more modulated heat sources, such as, for example, a microflame jet or $CO_2$ laser, directed against the fiber waveguide. By controlling the modulation of the heat source, the spatial distribution of the geometrical perturbation pattern can be controlled, thereby producing controlled mode coupling in the fiber waveguide.

9 Claims, 4 Drawing Figures

METHOD AND APPARATUS FOR INTRODUCING GEOMETRICAL PERTURBATIONS IN OPTICAL FIBER WAVEGUIDES

BACKGROUND OF THE INVENTION

1. Field of the Invention

This invention relates to method and apparatus for introducing geometrical perturbations along an optical fiber waveguide and, more particularly, to method and apparatus for introducing mode-coupling and geometric perturbations along optical fiber waveguides using a modulated heat source.

2. Description of the Prior Art

Modal dispersion in a multimode optical waveguide can be reduced by deliberately enhancing the mode coupling process in the waveguide. Such mode coupling can be accomplished, for instance, by introducing controlled imperfections or perturbances into the waveguide which tend to induce coupling among the various propagating modes thereby resulting in a transmitted pulse arriving at the other end of a guide as a single, slightly broadened, pulse.

It is known to form perturbation patterns which change the cross-sectional dimensions and/or the direction of the axis of an optical fiber waveguide as it is being drawn to enhance coupling between either pairs of propagating modes or all of the propagating modes by positioning one or more piezoelectric members in contact with the base of a preform opposite the end being heated and drawn. The piezoelectric members are selectively energized from a single source to produce the desired perturbations. In this regard, see U.S. Pats. No. 3,666,348 issued to E. A. J. Marcatili on May 10, 1972, and U.S. Pat. No. 3,687,514 issued to S. E. Miller et al on Aug. 29, 1972.

U.S. Pat. No. 3,499,194 issued to H. J. Schmick on Mar. 10, 1970 relates to a method of glass texturizing wherein a glass filament raised to a temperature within the working temperature range of the glass is permanently waved by passing the filament through an orifice oscillating laterally to the direction of the filament travel. The waves thus formed in the filament are accumulated, compacted and cooled to a temperature below the working temperature.

U.S. Pat. No. 3,923,478 issrued to H. M. Presby on Oct. 14, 1975, relates to methods for introducing geometric variations in optical fibers. There, one or more inert gas streams are directed against a fiber as it is pulled from a heated preform. The gas, whose force against the fiber is modulated, serves to displace the fiber in a direction transverse to the pulling direction of the fiber axis and the fiber diameter. Various means are also disclosed, such as valving systems, for properly modulating the force intensity of the gas against the heated fiber.

BRIEF SUMMARY OF THE INVENTION

The present invention relates to method and apparatus for introducing geometrical perturbations along an optical fiber waveguide and, more particularly, to method and apparatus for introducing mode-coupling and geometric perturbations along optical fiber waveguides using a modulated heat source.

The present invention further relates to method and apparatus for concurrently heating waveguide and forming controlled perturbations in the waveguide using a modulated heat source to enhance the mode coupling process in the waveguide.

Other and further aspects of the present invention will become apparent during the course of the following description and by reference to the accompanying drawings.

DESCRIPTION OF THE DRAWINGS

Referring now to the the drawings, in which like numerals represent like parts in the several views.

DETAILED DESCRIPTION OF THE INVENTION

Figure 1:
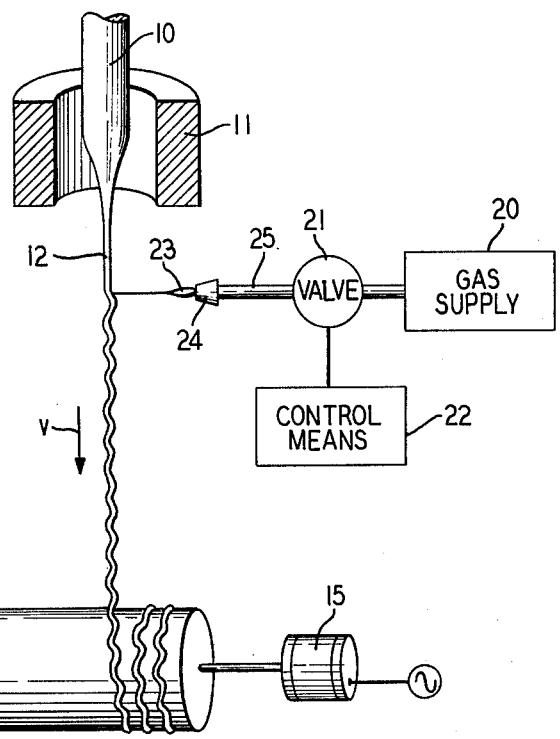
FIG. 1 is a partially schematic, partially diagrammatic view of an illustrative apparatus for manufacturing an optical fiber according to the present invention.

Referring to the drawings, FIG. 1 shows an arrangement for fabricating an optical fiber waveguide in accordance with the present invention comprising a modulated heat source for concurrently heating the fiber and forming controlled perturbations along the fiber as it is being drawn. Typically, optical fibers are drawn from a glass by heating the glass in an oven and then pulling on the molten portion. Thus, in FIG. 1, a glass preform 10 is sown extending into an oven 11 where it is circumferentially heated. The molten portion of preform 10 is drawn down at a uniform velocity $v$ with a drum 14 driven by a motor 15 to form an optical fiber 12. So long as preform 10 is subjected to a constant temperature and a constant pulling velocity, a fiber 12 of uniform diameter and unidirectional axial alignment is produced.

As was described in U.S. Pat. No. 3,687,514, issued to S. E. Miller et al. on Aug. 29, 1972, when an ideal multimode optical fiber having a uniform diameter and unidirectional axial alignment is used to connect a transmitter to a receiver, no coupling will occur between the various propagating modes. For instance, if a signal pulse comprising each of two modes is applied, simultaneously, at the transmitter end of the guide, each mode will propaged along the guide independently of the other mode and arrive at the receiver end of the guide at a time determined by its group velocity. Thus, a pulse in mode $M_1$ propagating at a velocity $v_1$ will arrive after a time $t_1$ equal to $1/v_1$, while a pulse in mode $M_2$ propagating at a velocity $v_2$ will arrive at another time $t_2$ equal to $L/v_2$ where L is the guide length. The time difference, T, or the dispersion, is equal to $t_2-t_1$. Because any practical fiber guide is not perfect, there will, in fact, be some coupling between the modes so that the energy tends to arrive at the receiver over the entire interval between $t_1$ and $t_2$. Since the interval, T, is much greater than the width of the original pulse, a second pulse must be delayed the equivalent of interval T to permit information recovery at the receiver. Therefore, the amount of information that can be transmitted and recovered is limited by the amount of dispersion in a fiber guide. It is evident that if the time difference T can be reduced, more information can be sent over the guide in a specified time period and, in turn recovered at the receiver.

Dispersion in a multimode fiber waveguide can be reduced by radially varying the refractive index of the wave guide core material to enhance mode coupling, as disclosed, for instance, in U.S. Pat. No. 3,909,110 issued to D. Marcuse on Sept. 30, 1975. Another method for enhancing mode coupling to reduce dispersion is to introduce prescribed nonuniformities along the fiber waveguide as described hereinbefore with regard to te prior art.

In accordance with the present invention, the known apparatus for drawing a fiber waveguide having a uniform diameter and unidirectional axial alignment is modified to include a modulated heat source for concurrently heating the drawn optical fiber waveguide 12 and forming controlled perturbations therealong. As shown in FIG. 1, one arrangement for providing a modulated heat source includes a gas supply 20 connected to a nozzle 24 by means of a length of tubing 25. A valving means 21, controlled by a compatible control means 22, is positioned between gas supply 20 and nozzle 24 to modulate the gas flow in a predetermined sequence and, in turn, modulate the intensity of the heat and force of microflame jet 23. Typical valving and control means which can be used are shown in U.S. Pat. No. 3,912,478, discussed hereinbefore, and include, for instance, either a tubing pump wich controls the gas flow by compressing a flexible tubing 25 by a cam, or an electromechanical valve controlled by a separate signal source. The modulation of athe intensity of microflame jet 23, in turn, directly affects both the reheating of the waveguide 12 to at least within its working temperature and the formation of the perturbations along waveguide 12 as waveguide 12 is drawn through the tip of microflame jet 23 at a uniform velocity by drum 14.

Figure 2:
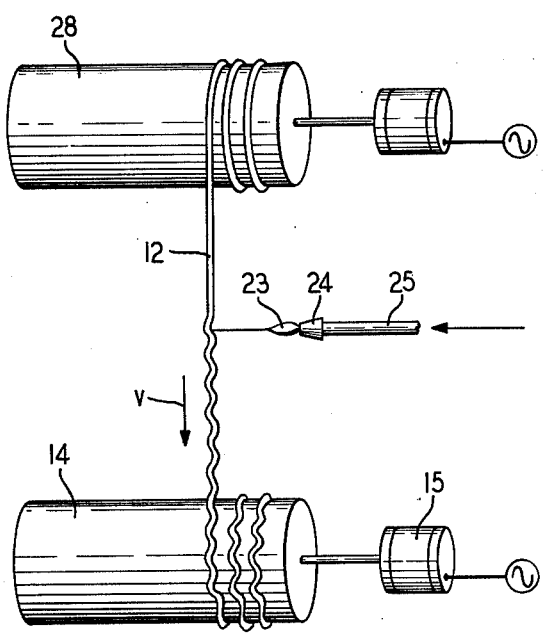
FIG. 2 is a partially schematic, partially diagrammatic view of an alternate apparatus for manufacturing an optical fiber according to the present invention.

In operation, nozzle 24 of the modulated heat source is both aimed at waveguide 12 and positioned therefrom a distance which preferably maintains the tip of the modulating microflame jet 23 incident to waveguide 12 as the perturbation pattern is formed. However, to form the desired perturbation pattern it is necessary to properly control the interrelationship between the intensity of the modulating microflame jet 23 and the velocity, $v$, at which waveguide 12 travels through the tip of microflame jet 23. For example, where only a sinusoidal perturbation pattern is to be formed by changing the axial direction of waveguide 12, the modulating intensity of microflame jet 23 and the velocity by which waveguide 12 passes therethrough must be adjusted to cause a reheating of waveguide 12 to within only its working temperature while the force from modulating microflame jet 23 displaces the waveguide axis in the desired manner. Where the disired perturbation pattern includes changes in both the cross-sectional dimensions and the direction of the axis of waveguide 12, the modulating intensity of microflame jet 23 and the velocity by which waveguide 12 passes therethrough must be adjusted to cause waveguide 12 to be cyclically reheated between its working temperature and the molten state to produce the desired changes in the cross-sectional dimension while the force from modulating microflame jet 23 concurrently displaces the waveguide axis in the desired manner. The velocity at which the fiber waveguide is advanced past the heat source, the intensity of the energy from the heat source, and the degree and sequence for modulating the intensity of the energy from the heat source can be easily predetermined by performing a number of sample runs and using the data therefrom FIG. 2 depicts a variation of the apparatus shown in FIG. 1 for use in situations where the fiber waveguide 12 was previously drawn and stored on a reel 28. Accordingly, in the second embodiment of the invention the fiber waveguide 12 is fed from supply reel 28 onto take-up reel 14 while the modulating microflame jet 23 of FIG. 1 forms the desired perturbation pattern along waveguide 12. As with the arrangement of FIG. 1, the intensity of the modulated microflame jet 23 of FIG. 2 and the velocity at which waveguide 12 is passed through the tip of microflame jet 23 must be controlled to permit waveguide 12 to be heated to within its working or molten temperature for properly forming the desired perturbation pattern.

Figure 3:
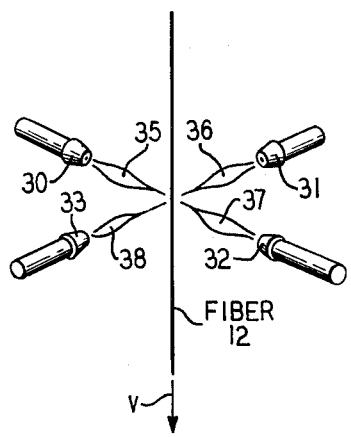
FIG. 3 illustrates the use of a plurality of modulated heat sources to control the perturbation pattern along an optical fiber waveguide.

Depending upon the complexity of the perturbation pattern that is to be produced, two or more modulated heat sources can be directed onto the fiber waveguide 12. FIG. 3 illustrates the use of a plurality of microflame jets. In particular, four nozzles 30, 31, 32 and 33 are shown symmetrically disposed about fiber waveguide 12. More generally, the microflame jets 35, 36, 37 and 38 emanating from nozzles 30, 31, 32 and 33, respectively, can be directed at the same or different axial regions along fiber waveguide 12. In any case, the gas flow to the respective nozzles is separately controlled by any one of several means, such as those mentioned hereinabove, and, in concert, serve to control the concurrent heating and transverse displacement of fiber waveguide 12 along two mutually perpendicular directions to form the desired perturbation pattern which can include a sinusoidal or a helical pattern.

The present invention has been described primarily with relation to a modulated heat source using microflame jets. However, it will be understood that such description is exemplary only and is for purposes of exposition and not purposes of limitation. It will be readily appreciated that the invention concept is equally applicable for use with any other modulated heat source, such as, for example, a modulating laser beam, which can produce the desired perturbation pattern.

Figure 4:
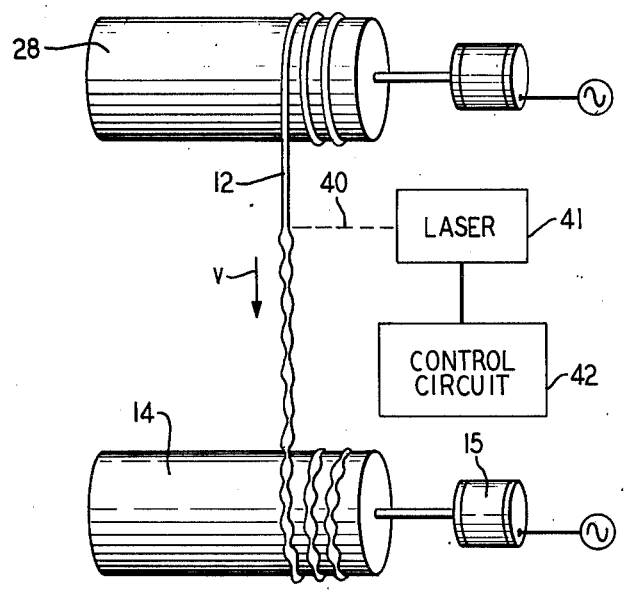
FIG. 4 is a partially schematic, partially diagrammatic view of another alternate apparatus for manufacturing an optical fiber according to the present invention.

For example, where it is desired to produce a perturbation pattern along fiber waveguide 12 which constitutes only variations in the cross-sectional dimension, the apparatus of FIG. 4 may be used. There, a laser beam 40 from a laser 41, wich may comprise, for example, a $CO_2$ laser, is applied to fiber waveguide 12 to soften the waveguide 12 while it is being fed from a supply reel 28 to take-up reel 14. The intensity of the laser beam 40 is modulated under the direction of a control circuit 42 to cause waveguide 12 to be sequentially heated between its working and molten temperature in a manner to form the desired perturbation pattern. It is, of course, also within the scope of the present invention to use two or more laser beams to form the desired perturbation pattern.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A method of introducing controlled geometrical perturbations along a conventional optical fiber waveguide comprising the steps of:

advancing the optical fiber waveguide through the energy emanating from a heat source, while simultaneously modulating the intensity of the energy from the heat source in a predetermined sequence and in a relationship to the speed at which said optical fiber is being advanced through said energy to concurrently heat the optical fiber waveguide to at least within its working temperature and deform the fiber waveguide with the energy from the heat source to yield the desired controlled geometrical perturbation pattern along the waveguide.

2. The method according to claim 1 wherein the modulating step further includes varying the energy from the heat source by an amount which will cause the optical fiber waveguide to by cycled between its working temperature and its molten temperature in a predetermined sequence.

3. The method according to claim 1 wherein the heat source is a gas supply connected to a nozzle for forming a microflame jet which is directed onto the advancing fiber waveguide; and the modulating step further includes varying the gas flow to the microflame jet in a predetermined sequence by means of a valve under the control of a control means to modulate the intensity of the microflame jet by predetermined amounts.

4. The method according to claim 1 wherein the heat source is a source of a beam of coherent, collimated radiation which is focused onto said fiber waveguide, and the modulating step further includes varying the energy of said beam of radiation in a predetermined sequence by means of a control circuit connected to said heat source.

5. The method according to claim 1 wherein a plurality of heat sources are directed at and disposed around the optical fiber waveguide; and said modulating step further includes separately modulating the energy from each of the heat sources in a predetermined sequence by means of a separate control means to produce the desired geometrical perturbation pattern along the waveguide.

6. Apparatus for introducing controlled geometrical perturbations comprising changes in the direction of the axis and/or the cross-sectional dimensions along a conventional optical fiber waveguide, which comprises means for advancing the fiber waveguide through the energy emanating from a source of heat; and means for modulating the intensity of the energy from said source of heat in a predetermined sequence and in a relationship to the speed at which said fiber is being advanced through said energy to concurrently soften the fiber waveguide to at least within its working temperature and deform the fiber waveguide with the energy from said source of heat to yield the desired controlled geometrical perturbation pattern along the fiber waveguide.

7. The apparatus according to claim 6 wherein:

said source of heat comprises a gas supply connected to a nozzle for forming a microflame jet which is directed onto the advancing fiber waveguide; and said modulating means comprises a valve under the control of a control means for modulating the gas flow from said gas supply to said nozzle and, in turn, varying the intensity of said microflame jet in a predetermined sequence.

8. The apparatus according to claim 6 wherein:

said source of heat comprises a source of a beam of coherent, collimated radiation, and means for focusing said beam of radiation onto the advancing fiber waveguide; and said modulating means comprises a control means connected to said source of heat for varying the intensity of said beam of radiation in a predetermined sequence.

9. The apparatus according to claim 6 wherein said source of heat comprises a plurality of separate heat sources disposed about said fiber waveguide, the energy from each heat source being directed onto the advancing fiber waveguide; and said modulating means comprises separate control means for each heat source for separately modulating the energy from said each heat source in a predetermined sequence to form the desired geometrical perturbance pattern along said fiber waveguide.

* * * * *

UNITED STATES PATENT AND TRADEMARK OFFICE
CERTIFICATE OF CORRECTION

PATENT NO. : 4,038,062
DATED : July 26, 1977
INVENTOR(S) : Herman M. Presby

It is certified that error appears in the above-identified patent and that said Letters Patent are hereby corrected as shown below:

Column 1, line 47, "Patent No. 3,923,478 issured" should read --Patent No. 3,912,478 issued--. Column 2, line 33, after "first occurring glass" add --preform--; line 35, "sown" should read --shown--; line 51 "propaged" should read --propagate--; line 55, "$1/v_1$" should read --$L/v_1$--. Column 3, line 10, "te" should read --the--; line 31, "athe" should read --the--; line 54, "disired" should read --desired--. Column 4, line 40, "invention" should read --inventive--; line 49 "wich" should read --which--. Column 5, line 18, "by cycled" should read --be cycled--.

Signed and Sealed this

Fourteenth Day of March 1978

[SEAL]

Attest:

RUTH C. MASON
Attesting Officer

LUTRELLE F. PARKER
Acting Commissioner of Patents and Trademarks